United States Patent [19]

Holshausen

[11] Patent Number: 5,824,957
[45] Date of Patent: Oct. 20, 1998

[54] ELECTRICAL CABLE CONTAINMENT

[75] Inventor: Nicholas Hugo Holshausen, Transvaal, South Africa

[73] Assignee: Technology Finance Corporation (Proprietary) Limited, South Africa

[21] Appl. No.: 505,882

[22] Filed: Jul. 24, 1995

Related U.S. Application Data

[63] Continuation-in-part of Ser. No. 199,301, May 13, 1994, abandoned.

[30]  Foreign Application Priority Data

Sep. 3, 1991 [ZA] South Africa .......................... 91/6975

[51] Int. Cl.$^6$ ........................................................ H02G 3/04
[52] U.S. Cl. ............................. 174/95; 174/135; 174/136; 59/78.1
[58] Field of Search ................................ 174/48, 49, 101, 174/95, 96, 97, 98, 99 R, 100, 135, 136; 59/78.1, 900; 248/49, 51; 439/131, 577; 361/688, 690, 691, 692, 693, 694, 695, 730, 732, 735, 826; 220/3.2, 3.7, 4.02

[56]  References Cited

U.S. PATENT DOCUMENTS

| 4,840,023 | 6/1989 | Borsani ...................................... 59/78.1 |
| 4,894,491 | 1/1990 | Glan ........................................ 174/135 |
| 4,899,414 | 2/1990 | Irwin ................................... 174/136 X |
| 5,135,413 | 8/1992 | Pannizzo ............................... 174/48 X |
| 5,231,562 | 7/1993 | Pierce et al. .......................... 174/48 X |

FOREIGN PATENT DOCUMENTS

| 740571 | 8/1996 | Canada .................................... 220/3.2 |
| 0197546 | 10/1986 | European Pat. Off. . |
| 0412233 | 2/1991 | European Pat. Off. . |
| 1365129 | 5/1964 | France .................................... 174/136 |
| 1194027 | 6/1965 | Germany ............................. 174/65 R |
| 2161656 | 1/1986 | United Kingdom ..................... 174/95 |

*Primary Examiner*—Hyung S. Sough
*Attorney, Agent, or Firm*—Birch, Stewart, Kolasch & Birch,LLP

[57]  ABSTRACT

An electrical cable containment device includes an elongate flexible member having several containment passages extending the length of the device. Each passage has an entrance opening within which runs the length of the passage for inserting electrical cable laterally into the passage. The flexible member is formed of a plurality of relatively short elements, each of said elements having male and female connection formations formed on respective opposite ends hereof, the male connection formation on one element being connectable to the female connection formation of an adjacent element so that adjacent elements are interconnectaable end-to-end in a chain-like manner. The connection formations are configured to permit articulated movement between adjacent interconnected elements. The connection formations lie on the longitudinal centerline of the device an are configured to permit adjacent elements to articulate relative to each other through a predetermined maximum arc in a full 360° circle of movement.

11 Claims, 6 Drawing Sheets

ELECTRICAL CABLE CONTAINMENT

This application is a continuation-in-part of application Ser. No. 08/199,301 filed on May 13, 1994, now abandoned, the entire contents of which are hereby incorporated by reference.

BACKGROUND TO THE INVENTION

This invention relates to electrical cable containment. The invention will be particularly described with reference to the containment of electrical cables which attach to the rear of desk top computers and other office type equipment, but it is to be understood that aspects of the invention may have other applications.

Many desk tops support a wide range of electrical equipment. A modern office desk may have, for example, a personal computer, a telephone, and a calculator supported thereon. The computer will have a series of electrical wires or cables connecting thereto including wires which connect the computer to a printer, a central processing unit, or a modem. The wires from these items of equipment tend to be unsightly when viewed from the back of the desk. This problem is not too serious when the desk back is placed against a wall or panel but, especially in open plan offices, such an arrangement of the desk is not always feasible. Where the back of the desk faces into a room or onto a passage the wires present an unattractive sight.

SUMMARY OF THE INVENTION

According to a first aspect of the invention there is provided an elongate flexible member having a plurality of containment passages therein extending the length of the device, each passage having an entrance opening thereto which runs the length of the passage for inserting electrical cable laterally into the passage, the flexible member being formed of a plurality of relatively short elements, each of said elements having male and female connection formations formed on respective opposite ends thereof, the male connection formation on one element being connectable to the female connection formation of an adjacent element so that adjacent elements are interconnectable end-to-end in a chain-like manner, the connection formations being configured to permit articulated movement between adjacent interconnected elements, the connection formations lying on the longitudinal centreline of the device, the connection formations being configured to permit adjacent elements being adapted to articulate relative to each other through a predetermined maximum arc in a full 360° circle of movement.

The containment device may be made from a resilient flexible material, such as a plastics material, said material being sufficiently flexible to allow the insertion of cables into the passage and the removal of cables from the passage.

The containment device may be formed from a multiplicity of interconnected elements which, when connected together, form the elongate flexible member The elements may each carry connection formations thereon which enable the elements to be connected together end-to-end in a chain like manner. Each of the elements may have an axially aligned male member mounted on one end thereof and an axially aligned female member formed in the opposite end thereof, the male and female members being shaped and configured such that the male member of one element may be connectable to the female member of an adjacent member to hold adjacent members together, the two elements being movable relative to each other in an articulated manner. Optionally the male member is connected to the element on which it is mounted through an articulated connection. The articulated connection may be a ball and socket type connection.

According to a second aspect of the invention there is provided an electrical cable containment box which includes a back, sides, and a top, and which is adapted to connect to the back of an item of electrical equipment, there being at least one outlet opening from said box through which a plurality of electrical cables can pass. The box may have one or more feet adapted to extend underneath the item of electrical equipment so that, in use, the electrical equipment rests on, and thereby holds the box to the rear side of the electrical equipment. The box may be adjustable in width and/or height, and may have a series of openings therein which act as air vents.

The box, preferably has a connection facility incorporated therein for connecting a containment device of the type described herein to the box. That connection facility may compare a removable plate with said outlet opening formed therein and an access slot connecting said outlet opening to the edge of the plate for admitting electrical cables into the opening.

Embodiments of the invention are described in detail in the following passages of the specification which refer to the accompanying drawings. The drawings, however, are merely illustrative of how the invention might be put into effect, so that the specific form and arrangement of the various features shown is not to be understood as limiting on the invention.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF PREFERRED EMBODIMENTS

Figure 1:
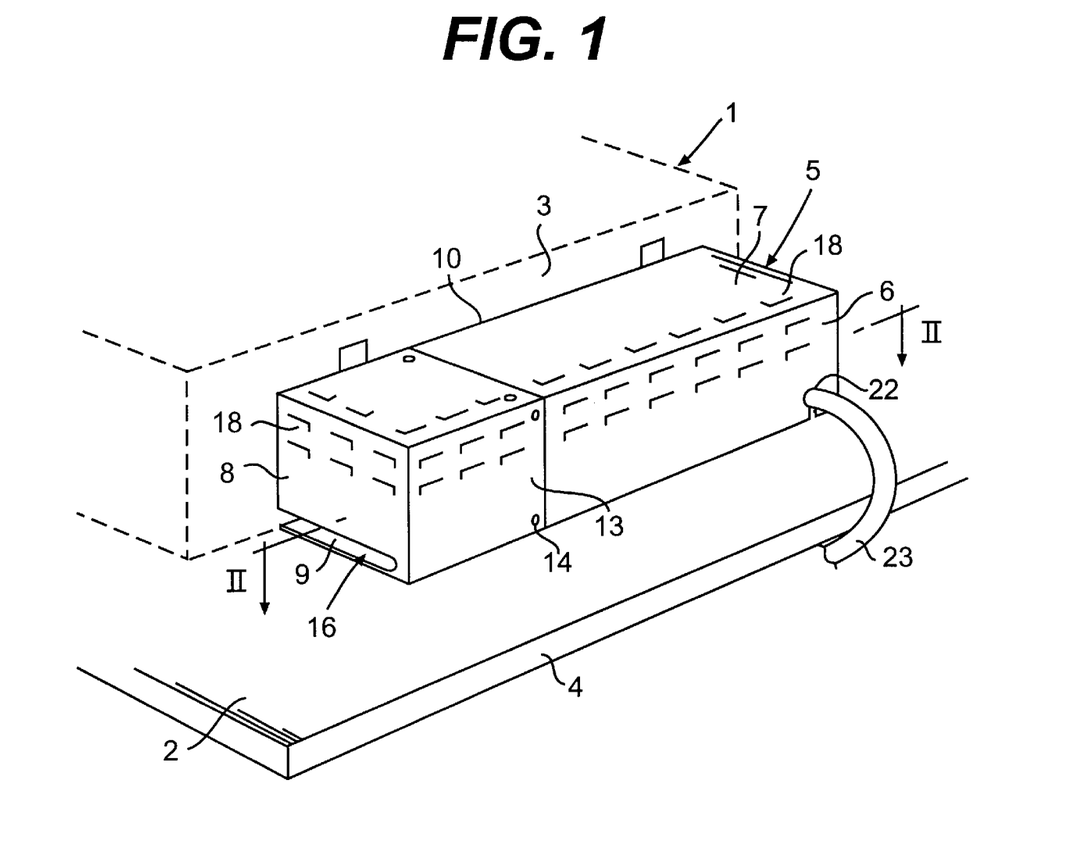
FIG. 1 shows a perspective view of a containment device and containment box according to the invention fitted to the rear side of an item of electrical equipment.
Figure 2:
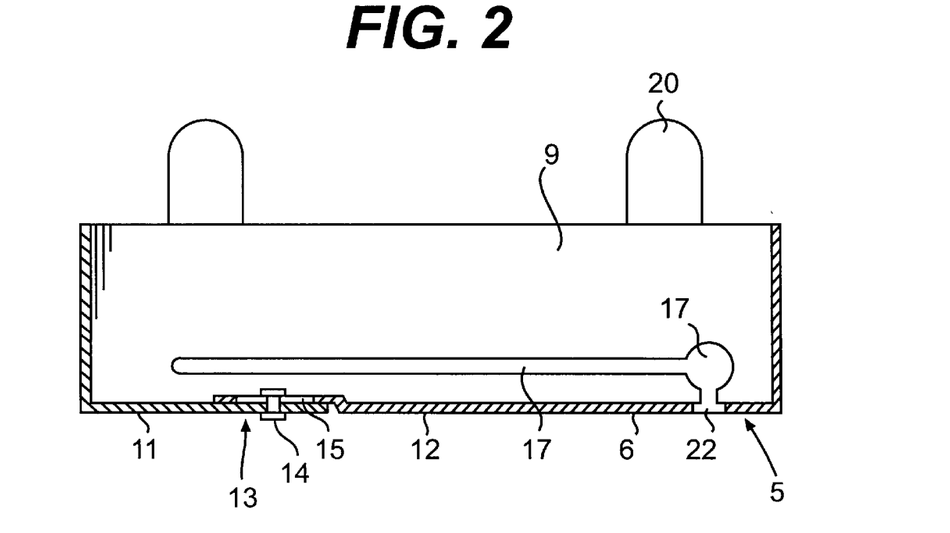
FIG. 2 shows a cross sectional view along line II—II of FIG. 1.
Figure 3:
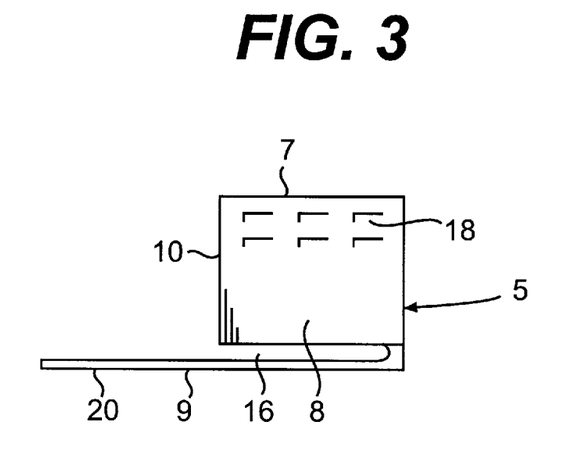
FIG. 3 shows a side view of a containment box according to the invention.

Referring initially to FIGS. 1, 2 and 3 an item of computer equipment indicated at numeral 1 rests on the upper surface of a desk 2 The rear side 3 of the electrical equipment faces towards the back 4 of the desk. The computer equipment 1 may, for example comprise desk top personal computer. As is well known, a series of electrical cables (not shown) will connect into the back 3 of the computer equipment 1 and this invention is particularly concerned with the containment of those cables.

A containment box 5 is fitted to the back face 3 of the electrical equipment 1. The box 5 includes a back panel 6 a top panel 7, side panels 8, and a floor panel 9. The front side 10 of the box (which is against the computer equipment 1) is open so that any wires or the like which extend from the back 3 of the electrical equipment will pass into the box 5 without interference.

The box 5 may be adjustable in width and/or height. The box depicted in FIGS. 1 and 2 of the drawings is adjustable in width. As shown clearly in FIG. 2 the box 5 is formed in two sections numbered 11 and 12 which overlap each other as indicated at 13 and are held together by a pin 14. The arrangement is such that the two sections 11 and 12 may slide towards or apart from each other and the one section 12 is provided with a slot 15 which limits the extent to which the two sections may be moved together or apart. This adjustment facility is provided so that the width of the box can be varied according to the item of electrical equipment to which it is to be fitted.

The box 5 is preferably provided with a series of openings in the side and/or floor thereof through which electrical cables can pass. As shown in the drawings, at least one side 8 of the box is provided with an opening as indicated at numeral 16. Electrical wires, for example, of a telephone or desk top calculator can pass into the opening 16. Thus, the telephone or calculator will sit on the desk alongside the electrical equipment 1 and the wares from the telephone and or calculator will pass into the box 5 through the side opening 16. In other instances the desk 2 may be provided with electrical wire openings in the upper surface thereof. These wires may, for example, be power cables or the like. The wires which pass up through the surface of the desk 2 may pass into the box 5 through openings 17 in the floor 9 of the box 5.

In many instances the computer equipment 1 to which the box 5 attaches will have a cooling fan connected thereto and therefore the box 5 may be provided with vents as indicated at numeral 18 to allow for the free passage of cooling air through the box to the item of computer equipment. Clearly it is not essential that the box 5 be made to be dimensionally adjustable. Indeed, in certain instances it may be preferable for the box to be custom made for a particular computer or like equipment and in this instance it will be coloured and contoured to conform exactly to the periphery of the respective item.

The box is preferably provided with means for connecting the box to the item of electrical equipment. This may conveniently comprise an extension of the floor panel 9 as indicated at numeral 20. The extension 20 is preferably substantially planar and is adapted to fit underneath the electrical equipment 1 so that the electrical equipment 1 rests on the extension 20. The extension 20 is preferably sufficiently thin so as not to unduly lift the electrical equipment relative to the desk surface. With the electrical equipment I resting on the extension 20 the box 5 will be firmly held against the back 3 of the electrical equipment. Clearly other forms of connection arrangements are possible such as clip connection and the like which connect the box 5 to the back face 3 of the electrical equipment Once all wires from the desk top including wires from electrical equipment have passed into the box 5 they will be gathered together and pass out of the box 5 though an outlet 22 in the back face 6 of the box 5. It will be appreciated that the box 5 will shield the manner in which the electrical wires connect to the electrical equipment 1 and thus the box 5 will serve to neaten the appearance of the back face 3 of the electrical equipment and the arrangement of wires in that region.

Figure 4:
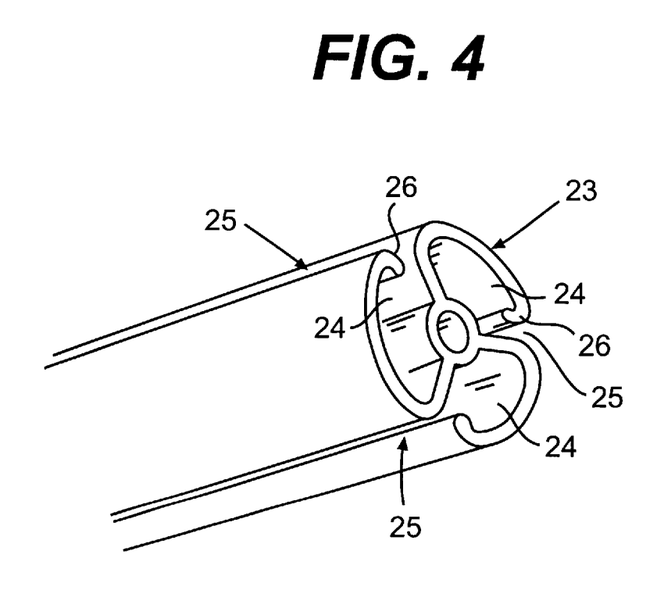
FIG. 4 shows a perspective view of one embodiment of containment device according to the invention.

It is preferred that an electrical cable containment device 23 connects to the opening 22. One example form of electrical containment device 23 is depicted in FIG. 4 of the drawings. The containment device as shown in FIG. 4 includes three passages 24 which run the length of the cable containment device 23. The passages 24 each have an entrance opening 25 which runs the length of the containment device 23 and provides an opening along the entire length of the passage 24.

The containment device 23 is preferably resiliently flexible to enable the containment device 23 to bend around corners to reach appropriate connection points such as electrical wall sockets. It is envisaged that the containment device 23 may be formed from a relatively flexible plastics material to enable it to adopt the required form. As indicated in FIG. 4 of the drawings the containment device 23 is formed of a single section of hose like material within which the passages 24 are formed. However, as will be described in more detail herebelow, the containment device 23 may be formed of an multiplicity of interconnected elements each of which includes a passage 24, the elements when aligned forming a substantially continuous series of passages 24 which extend the length of the device.

It is important that once cables have been inserted into the passages 24 through openings 25 they are retained within the passages 24. To achieve this it is preferred that some sort of return lip is provided within the passage 24 at the region of the entrance 25. Lips 26 are shown which run the length of the openings 25 and serve to retain cables in each of the passages 24.

It is preferred that the device 23 is formed of a resiliently flexible material such as a plastics material so that the openings 25 can be widened to insert cables into the passages 24, or remove cables from the passages 24. It will be appreciated that some cables are of larger diameter than other cables and thus it is important that the entrances 25 are able to open sufficiently widely to accommodate a range of cable thicknesses. The return lips 26 will serve to capture and hold whatever cables are located in the different passages 24.

Figure 5:
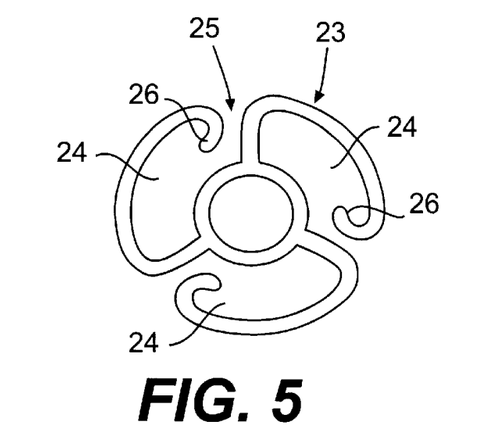
FIG. 5 shows an end view of the containment device depicted in FIG. 4.
Figure 6:
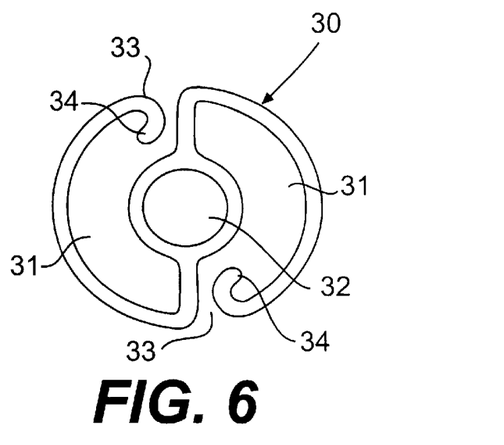
FIG. 6 shows an end view of an alternative embodiment of containment device.
Figure 7:
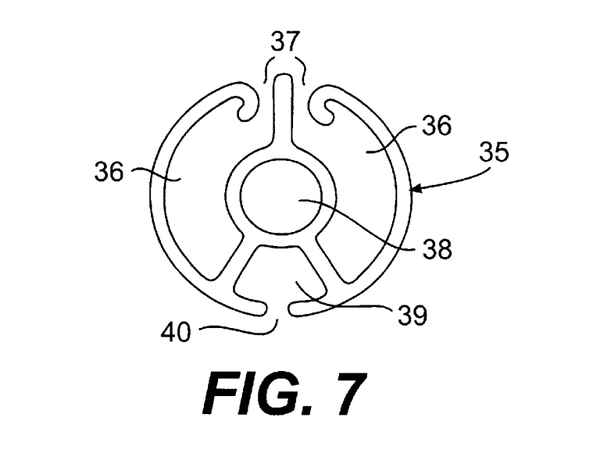
FIG. 7 shows an end view of yet a further embodiment of containment device.

It is preferred that there are at least two passages so that different forms of cables may be located in separate passages. For example, power cables may be all located in one of the passages 24 and information conveying cables such as those from telephones and or computers may be conveyed in other passages FIGS. 6 and 7 depict different forms of containment devices. FIG. 6 shows a containment device 30 having two passages 31 which extend the length of the device. A central opening 32 is provided to receive a rope as will be described in more detail with reference to FIG. 8. The two passages 31 each have an opening 33 and a return lip 34 similar to the arrangement shown with respect to FIGS. 4 and 5. FIG. 7 shows a yet further alternative in which a containment device 35 is provided with a pair of passages 36 each having an opening 37. A central passage 38 is also provided. The device 35 has an additional passage indicated at 39 which may be used to mount the device 35 to a support surface. The passage 39 has an opening 40 and it is envisaged that a rail or key (not shown) could be mounted to a fixed surface and used to mount the device 35 to that fixed surface with the rail or key located in the passage 39.

Figure 8:
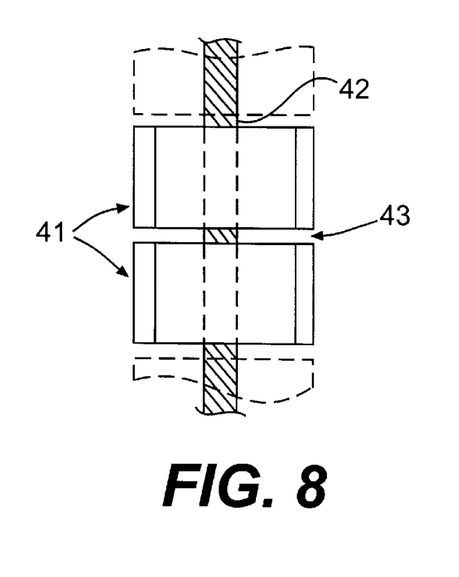
FIG. 8 shows a side view of a series of interconnected containment elements.
Figure 9:
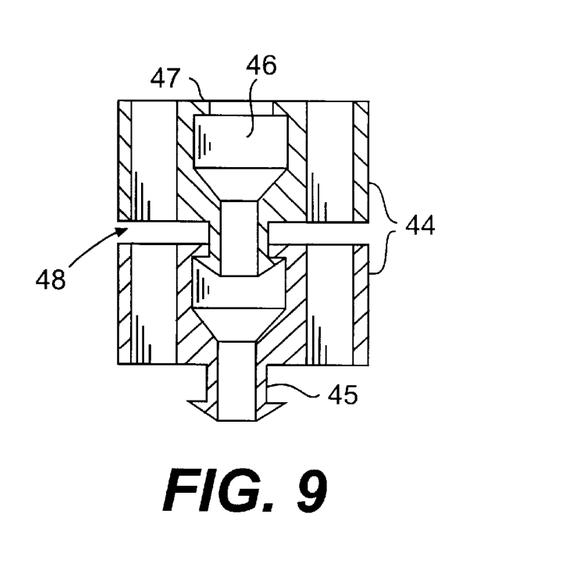
FIG. 9 shows a cross sectional side view of an alternative embodiment of interconnected containment elements.
Figure 10:
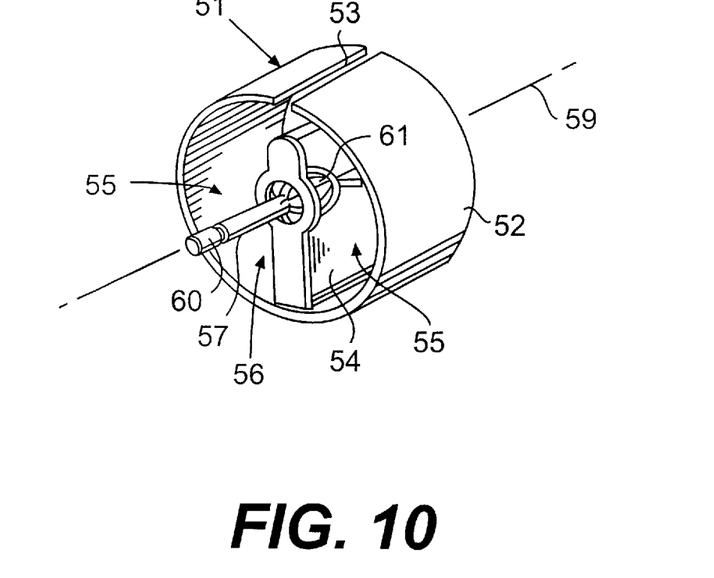
FIG. 10 shows a front perspective view of an element of a further embodiment of containment device.
Figure 11:
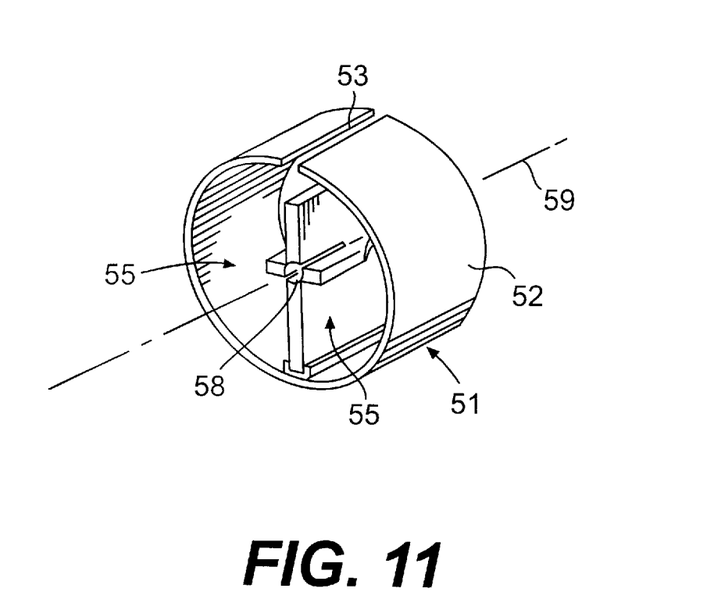
FIG. 11 shows a rear perspective view of the device shown in FIG. 10.
Figure 12:
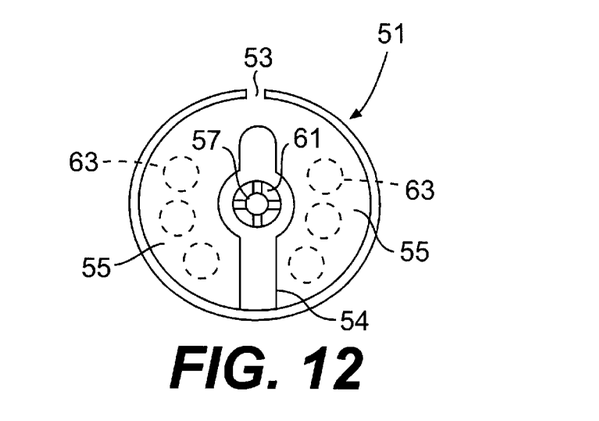
FIG. 12 shows a rear end view of the device shown in FIG. 10.

As previously mentioned, it is important that the containment device 23 is flexible. To achieve the desired degree of flexibility it may be preferable to form the device 23 from a series of interconnected elements as indicated in FIGS. 8 and 9. Referring specifically to FIG. 8, it will be noted that the series of elements indicated at numeral 41 are threaded onto a rope 42, the rope 42 running down the central passage which extends down the centre of each of the elements. A gap indicated at numeral 43 is provided between adjacent elements and this gap 43 allows the assembled device to flex as required.

Figure 13:
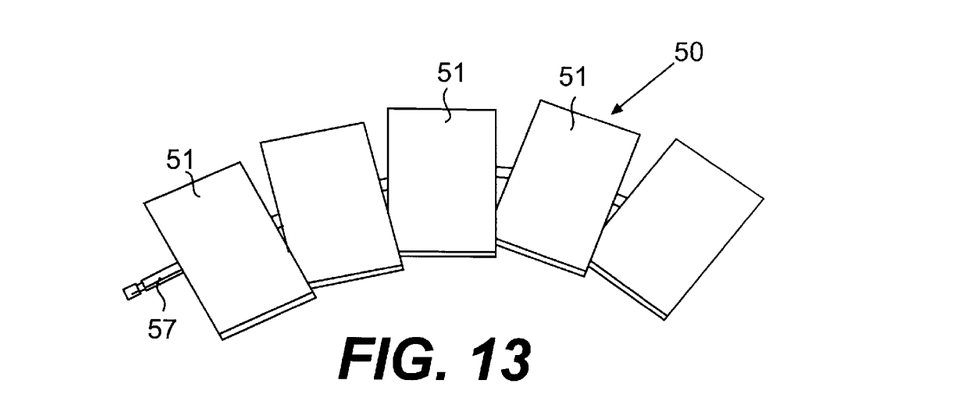
FIG. 13 shows a side view of three elements of the type shown in FIG. 10 connected together.

A somewhat similar arrangement is shown in FIG. 9 but in this arrangement the elements 44 each have a connection formation 45 formed on one end thereof, the connection formations being adapted to fit into a socket 46 on the other end of an adjacent element, the sockets 46 having all entrance lip 47 which ensures that the connection formation 45 engages and is releasably held within the socket 46. A gap 48 is defined between adjacent elements 44 and this gap permits the assembled device to flex in the manner previously described Turning now to FIGS. 10 to 13 of the drawings a yet further embodiment of containment device is shown. The containment device indicated by numeral 50 in FIG. 13 is comprised of a multiplicity of separable elements 51, each of which is formed of a generally tabular body 52 slit longitudinally, as indicated by slit 53. A mounting bracket 54 is formed within the interior of the tubular body and that bracket 54 divides the interior into two passages 55. The body 52 is formed of a resilient material such as moulded plastics, which is resiliently distortable. To obtain access to the passages the slit 53 is widened by distorting the body outwardly. The slit is located midway between the two passages 55 so that a cable being inserted into the passages can be selectively located in one or other of the two passages as required.

The mounting bracket 54 supports a connecting arrangement 56 for connecting the elements 51 together. The connecting arrangement 56 comprises a male member 57 and a female socket 58 on each element The male member and female socket both fit on the axis 59 of the elements and adjacent elements are connected together by clipping the distal end 60 of the male member into the female socket of the adjacent member. In this manner a chain of end-to-end elements can be formed which together define a containment device 50 as shown in FIG. 13. In a usual application there will be approximately 30 elements per meter of containment device.

It is preferred that there is an articulated connection between adjacent elements. This can be achieved by, for example, making the male member pivotable relative to the mounting bracket, or having the end 60 of the male member pivotable relative to the female socket 58 of the adjacent element the present arrangement the proximate end 61 of the male member 57 is coupled to the bracket 54 by a ball and socket type connection 61 which provides the necessary articulation facility and enables the adjusted elements to be moved out of axial alignment with each other, as depicted in FIG. 13.

Figure 14:
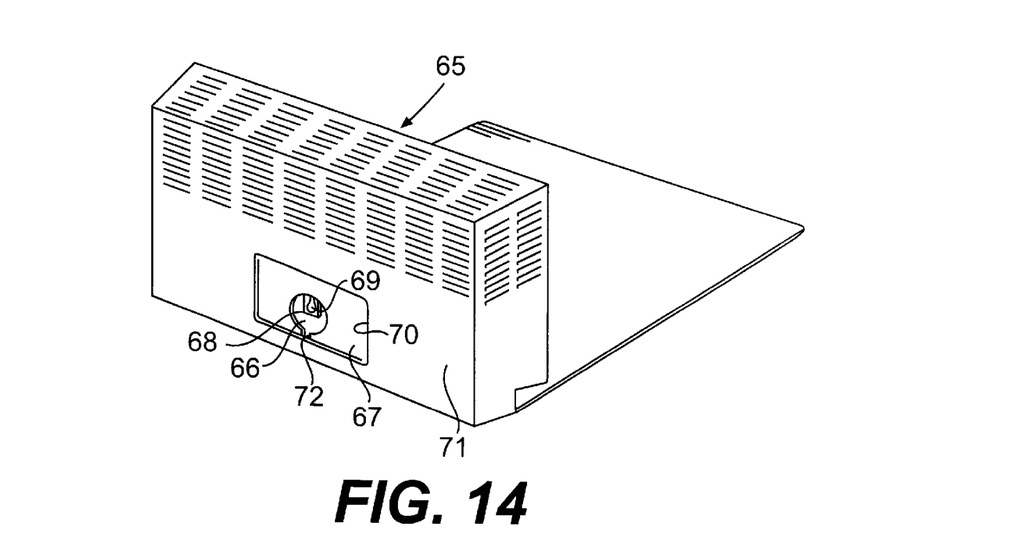
FIG. 14 shows a perspective view of an alternative embodiment of containment box suitable for having a containment device of the type shown in FIGS. 10 to 13 connected thereto.
Figure 15:
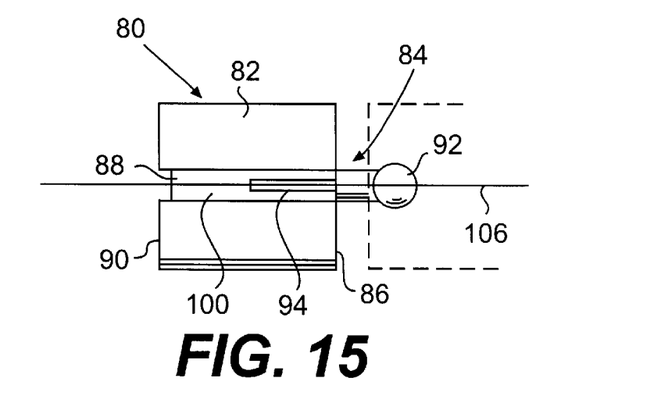
FIG. 15 shows a side view of a yet further embodiment of a containment device according to the invention.
Figures 16, 17:
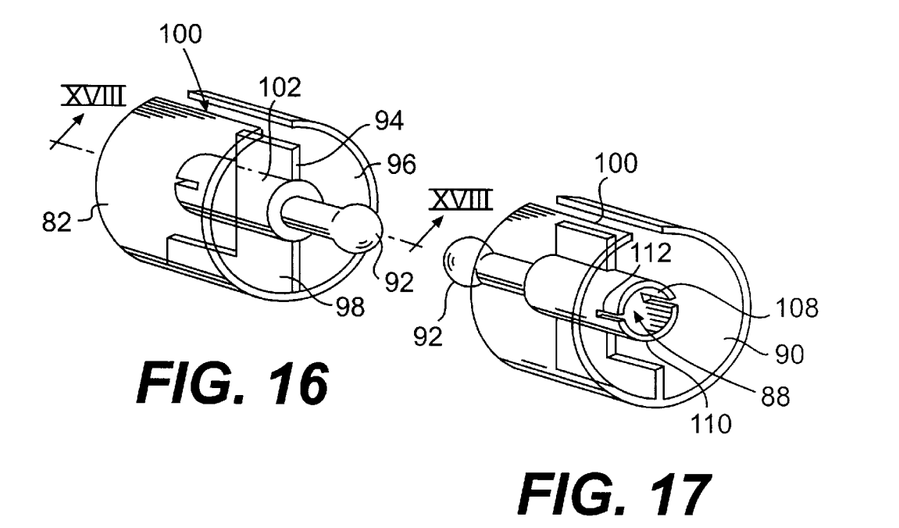
FIGS. 16 & 17 show front and rear perspective views of one of the elements of the containment device shown in FIG. 15.

The box 65 depicted in FIG. 14 has an outlet opening 66 formed in a removable plate 67. The plate 67 has a connection arm 68 mounted thereto having a keyway 69 therein. The male member 57 is shaped to fit into the keyway 69 and engage therewith in order to secure the connection thereto of a containment device 50. Thus, cables 63 from computer equipment will be passed out of the opening 66 and then engaged in a containment device 50 in the manner previously described. The containment device will then be connected to the arm 68 by clipping the male member 57 of the last element into the keyway 69.

The plate 67 is removable from the rest of the box. Once removed a large rectangular opening 70 is defined in the back wall 71 of the box. The plate 67 has a transverse slot 72 extending between the edge of the plate and the outlet opening 66. The cables will be passed along ibis slot 72 to locate them in this outlet opening prior to fitting the containment device 50 thereto. This arrangement will simplify the fitting of the cables into the outlet opening.

Any suitable arrangement may be made for connecting the opposite end of the containment device to the wall or other connection point where mains sockets and other connection sockets are located. Those sockets may be shielded by a suitable box or panel (not shown) which may have a male member similar to that of the elements 51 for connection to the containment device 50.

Turning now to FIGS. 15 to 18 of the drawings, a further embodiment of the device is shown. This embodiment is similar to that shown in FIG. 9 of the drawings. As shown, each element 80 is of unitary construction comprises a body 82 having a connection pin 84 on the forward facing side 86 thereof and a socket 88 projecting rearwardly from the rearward facing side 90 thereof. The pin 84 has a spherical head 92 on the distal end thereof and the spherical head 92 is receivable in the socket 88 of an adjacent element to connect the elements together in a chain-like manner. A partition 94 divides the interior of the body into two passages 96 and 98. Access to the passages is obtainable through a slit 100 which runs the length of the body 82 and overlies the partition 94. The body is resistently flexible.

The socket 88 is formed in a cylindrical member 102 which is integrally formed with the partition 94 and is supported by the partition 94. The body 82 is substantially circular in section and the socket 88 and pin 84 are coaxial with the central axis 106 of the body.

The socket 88 has a slightly constricted mouth 108 which is formed by inwardly curved lips 110. This constricted mouth 108 is shaped in this fashion to captively hold the head 92 of an adjacent element inserted therein so that the elements can be connected together end-to-end, in a chain-like manner. Slots 112 are formed on either side of the socket 88 in the region of the mouth 108 which will facilitate the flexing of the lips 110 as the head 92 is inserted into the socket. Thus, as the head is inserted into the socket a snap-like connection will be achieved allowing for easy connection and separation of the elements. It will be appreciated that this will allow for additional elements to be inserted into the chain at any point as is often required where the chain is to be lengthened due, for example, to rearrangement of furniture.

Figure 18:
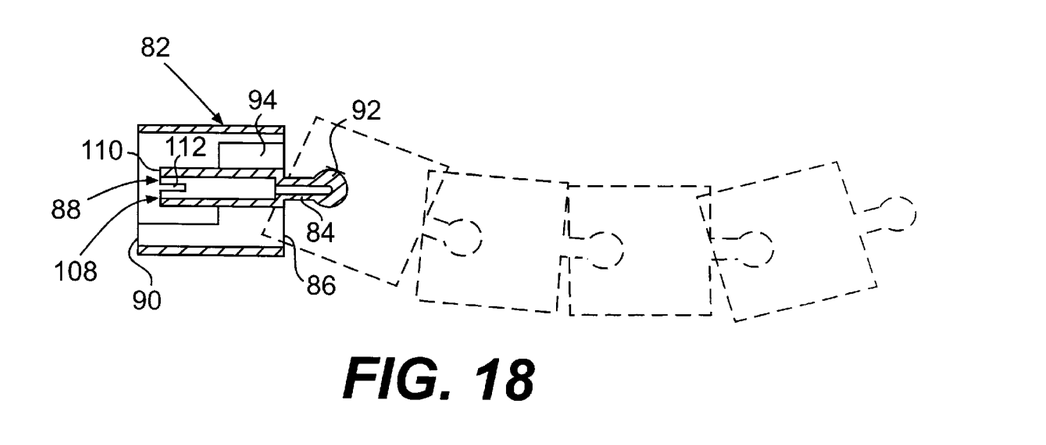
FIG. 18 shows a sectional view of the containment device along line XVIII—XVIII depicted in FIG. 16.

It will be appreciated that because the socket 88 and pin 84 are on the centreline 106 of the element, adjacent elements will be able to articulate relative to each other about the head 92 in the manner depicted in FIG. 18. Since the head 92 is spherical in shape the elements are in no way constrained as to the direction in which they are able to articulate relative to each other. Thus, each element can articulate relative to the other through the maximum arc of movement in a fall 360°. This will allow the chain of elements to flex through a relatively tight radius in any required direction. It will be appreciated that this ability to flex in any direction is highly desirable so as to ensure that the chain of elements is unrestrained and can follow the most desirable path between the item of electrical equipment and the point where the cables within the chain connect to wall sockets or the like.

A further advantage of the cable containment device depicted in the drawings is that cables can be inserted into or removed from the chain laterally along the length of the chain. This ensures that cables do not need to be threaded through the passages in the chain from one end thereof to the other but rather can be inserted laterally as and when necessary. Thus, if it is necessary to add an additional cable length to the chain this can be done in situ without in any way disrupting the cables already in the chain. Also, if it is necessary for an individual cable to connect into the chain intermediate the ends of the chin this clearly can be done by simply leading that cable out of the chain between adjacent links.

It is to be understood that various alterations, modifications and/or additions may be introduced into the constructions and arrangements of parts previously described without departing from the spirit or ambit of the invention as defined in the appended claims.

I claim:

1. An electrical cable containment device comprising:
    a generally cylindrical elongated flexible member formed of a plurality of short elements, wherein each said element having a generally cylindrical wall;
    a ball portion and a socket portion formed on respective opposite ends of each said element, said ball portions on said elements and said socket portions of adjacent elements of said elements being interconnected end-to-end in a chain-like manner; said ball and socket portions lying generally on a longitudinal center line of the device, said ball portion and said socket portion being disposed at substantially 180° relative to each other; and
    a mounting bracket disposed in each said element and dividing each said element into containment passages, said mounting bracket being connected to one side of said cylindrical wall and substantially intersecting the center line of the device, each mounting bracket supporting said ball and socket portions, wherein said ball and socket portions are configured to permit said adjacent elements to articulate relative to each other through a predetermined maximum arc in a full 360° circle of movement.

2. The electrical containment device according to claim 1, wherein each ball portion includes a connection pin, a configuration of the ball and socket portions being such that the respective adjacent elements may be snapped together, the connection being between the mounting bracket and the pin, or between the pin and the adjacent element, allowing said elements to articulate relative to each other.

3. The electrical cable containment device according to claim 2, wherein the connection pin is fixed to the mounting bracket and a distal end of the pin defines a head which is substantially spherically shaped, said socket defining an at least partial spherically shaped cavity into which the spherically shaped pin of an adjacent element is receivable.

4. The electrical cable containment device according to claim 3, wherein each socket portion is formed of a resilient plastics material which is adapted to flex to receive the head of an adjacent element when two elements are snapped together.

5. The electrical cable containment device according to claim 4, wherein a longitudinal slit is formed in each socket portion to provide for a resilient flexure.

6. The electrical cable containment device according to claim 2, wherein the connection pin has a proximal end which is connected to the mounting bracket via an articulated connection.

7. The electrical cable containment device according to claim 6, wherein the proximal end of the connection pin has a spherically shaped formation thereon, and the mounting bracket has a retaining formation thereon for captively holding the pin to the mounting bracket in a manner which allows the pin to articulate about the spherically shaped formation.

8. The electrical cable containment device according to claim 1, wherein each said element includes a single slotted opening which provides access to all containment passages within that element.

9. The electrical cable containment device according to claim 1, wherein the elements are formed of resiliently flexible plastics material, the resilience of the material being such that the elements can be resiliently flexed to enlarge the entrance opening thereto to facilitate the insertion and removal of electrical cables into or from the respective containment passages.

10. The electrical cable containment device of claim 1 further comprising:
    at least one slotted opening formed in each element and disposed at 180° relative to each mounting bracket and communicating with the respective passages.

11. In combination with an item of electrical equipment having a plurality of cables emanating from a rearward portion thereof, an apparatus for containing said cables comprising:
    an enclosure positioned at said rearward portion of the equipment for confining the plurality of cables, wherein the enclosure has a back panel with a first opening;
    means for retaining the enclosure relative to the equipment, said enclosure including a second U-shaped opening through which the plurality of cables from the electrical equipment pass;
    a plurality of cable retaining elements arranged end-to-end in a chain-like manner to form a generally cylindrical flexible member including a first retaining element attached to said first opening, wherein the cable retaining elements have generally arch shaped through passages for receiving the respective cables and entrances for inserting the cables laterally into said passages; and at least one of male connections with female connections formed on respective opposite ends of said elements and a plurality of lips formed on each of said elements, wherein each said lip is formed adjacent to each said entrance and curved inwardly to project into one of the generally arch shaped passages.

* * * * *